United States Patent
Zagorski et al.

(10) Patent No.: US 9,156,447 B2
(45) Date of Patent: Oct. 13, 2015

(54) METHODS AND APPARATUS FOR A VEHICLE EMERGENCY CONTROL SYSTEM

(75) Inventors: Chad T. Zagorski, Clarkston, MI (US); Aamrapali Chatterjee, Okemos, MI (US); Nikolai K. Moshchuk, Gross Pointe, MI (US); Shih-Ken Chen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 741 days.

(21) Appl. No.: 12/790,455

(22) Filed: May 28, 2010

(65) Prior Publication Data

US 2011/0295464 A1 Dec. 1, 2011

(51) Int. Cl.
*B60T 7/12* (2006.01)
*B60T 7/18* (2006.01)
(Continued)

(52) U.S. Cl.
CPC *B60T 7/18* (2013.01); *B60W 30/09* (2013.01); *B60W 30/095* (2013.01); *B60W 50/06* (2013.01); *B62D 6/006* (2013.01);
(Continued)

(58) Field of Classification Search
CPC ............... B60T 2201/022; B60T 2201/024; B60T 2210/12; B60T 7/18; B60W 10/18; B60W 10/20; B60W 30/02; B60W 30/08; B60W 30/09; B60W 30/095; B60W 30/0953; B60W 30/0956; B60W 30/16; B60W 30/162; B60W 30/181; B60W 30/18109; B60W 30/18172; B60W 40/06; B60W 40/064; B60W 40/068; B60W 40/072; B60W 40/076; B60W 40/107; B60W 40/109; B60W 50/06; B60W 50/14; B60W 50/16; B60W 2050/0008; B60W 2050/0026; B60W 2050/0031; B60W 2050/143; B60W 2050/146; B60W 2550/148; B62D 6/006; B62D 15/025; B62D 15/0255; B62D 15/026; B62D 15/0265; B62D 15/029
USPC .................................................. 701/41, 80
See application file for complete search history.

(56) References Cited

U.S. PATENT DOCUMENTS 5,699,040 A * 12/1997 Matsuda ....................... 340/435
6,125,319 A 9/2000 Hac et al.
(Continued)

FOREIGN PATENT DOCUMENTS

DE 19743383 A1 4/1998
DE 102007039176 A1 2/2009
DE 102010037639 A1 4/2011

OTHER PUBLICATIONS

German Office Action, dated Mar. 15, 2012, for German Patent Application No. 10 2011 107 105.2.
(Continued)

*Primary Examiner* — Jerrah Edwards
(74) *Attorney, Agent, or Firm* — Ingrassia Fisher & Lorenz, P.C.

(57) ABSTRACT

A vehicle control system defines a set of predetermined criteria relating to the motion of the vehicle and a set of vehicle actions associated with the set of predetermined criteria. The vehicle actions each specify a steering action and/or a braking action. Friction data indicative of a frictional attribute (for example, coefficient of friction) of the contact region between the vehicle and the surface is received. The predetermined criteria are modified based on the friction data. When one or more of the predetermined criteria are met, the system applies the corresponding steering and/or braking actions.

9 Claims, 5 Drawing Sheets

(51) Int. Cl.
    *B60W 30/09*       (2012.01)
    *B60W 30/095*     (2012.01)
    *B60W 50/06*       (2006.01)
    *B62D 6/00*        (2006.01)
    *B62D 15/02*       (2006.01)
    *B60W 10/18*       (2012.01)
    *B60W 10/20*       (2006.01)
    *B60W 50/00*       (2006.01)

(52) U.S. Cl.
    CPC ...... *B62D 15/0265* (2013.01); *B60T 2201/022* (2013.01); *B60T 2201/024* (2013.01); *B60T 2210/12* (2013.01); *B60W 10/18* (2013.01); *B60W 10/20* (2013.01); *B60W 2050/0008* (2013.01); *B60W 2550/148* (2013.01)

(56) References Cited

U.S. PATENT DOCUMENTS

| | | | |
|---|---|---|---|
| 6,312,065 | B1 | 11/2001 | Freitag et al. |
| 6,922,624 | B2 | 7/2005 | Isaji et al. |
| 7,983,828 | B2 | 7/2011 | Ezoe et al. |
| 8,131,422 | B2 | 3/2012 | Jensen et al. |
| 8,180,547 | B2 * | 5/2012 | Prasad et al. .......... 701/71 |
| 2004/0122578 | A1 * | 6/2004 | Isaji et al. .......... 701/70 |
| 2009/0018740 | A1 * | 1/2009 | Noda et al. .......... 701/70 |
| 2011/0082623 | A1 | 4/2011 | Lu et al. |

OTHER PUBLICATIONS

USPTO, U.S. Non-final Office Action mailed Jul. 5, 2012 for U.S. Appl. No. 12/841,769.

Office Action, dated Aug. 31, 2012, for U.S. Appl. No. 12/841,769.

\* cited by examiner

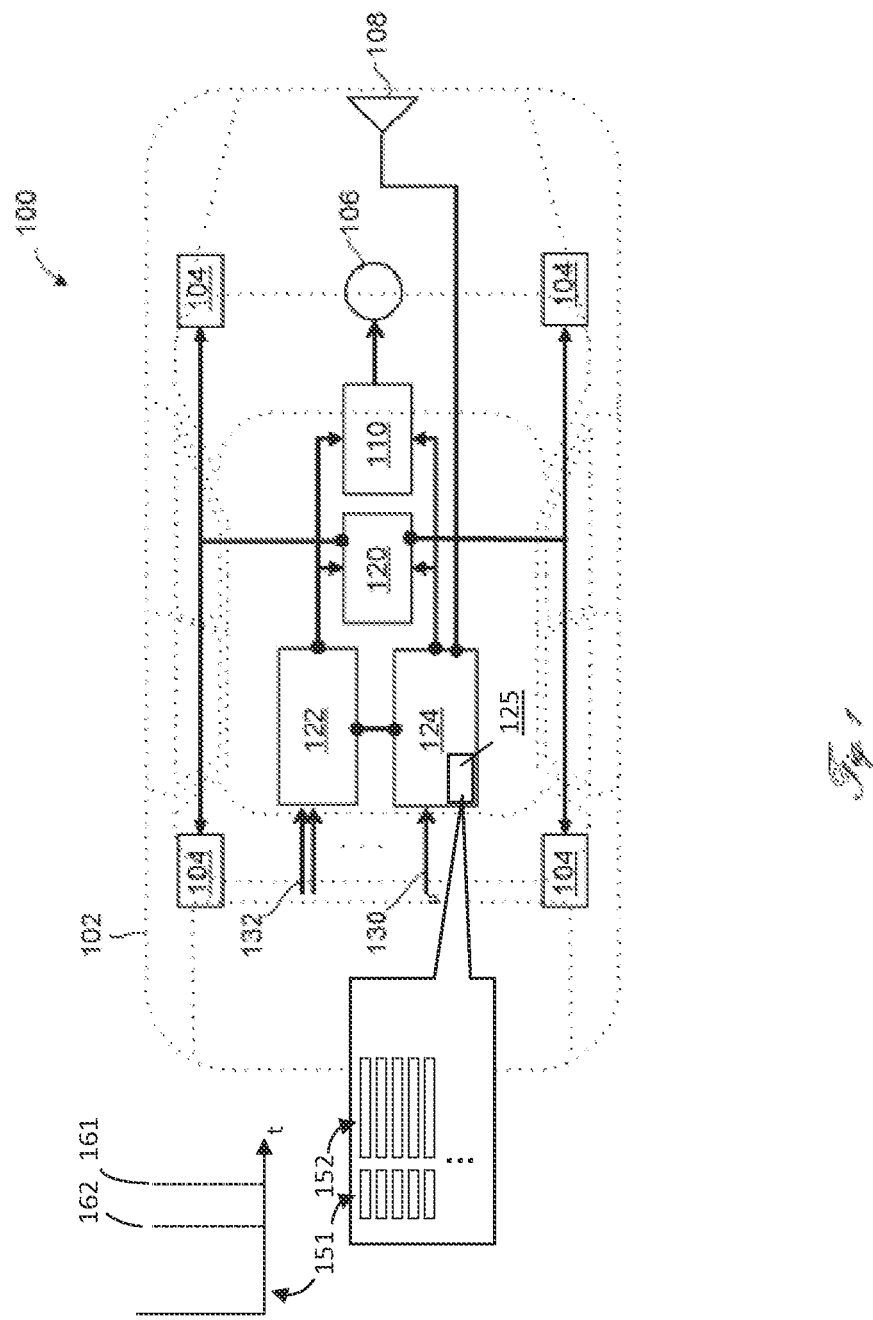

METHODS AND APPARATUS FOR A VEHICLE EMERGENCY CONTROL SYSTEM

TECHNICAL FIELD

Embodiments of the subject matter described herein relate generally to vehicle emergency control systems and, more particularly, to emergency braking and steering systems used in connection with collision prevention.

BACKGROUND

Modern vehicles often incorporate some form of stability control system to ensure that the actual path of the vehicle corresponds to the path intended by the driver, particularly during hard braking operations. Such vehicles might also include collision avoidance systems that sense whether an object is within the vehicle's path, and then take corrective action accordingly. This corrective action might take the form alerting the driver or autonomously applying braking and/or steering to reduce the relative velocity between the vehicle and the obstacle.

Prior art systems typically assume that the vehicle can maintain a specified lateral (sideways) and longitudinal (front/back) acceleration, usually about 0.8 g's lateral and 0.9 g's longitudinal. These acceleration values are then used by the system to determine how much braking and steering can be applied while still maintaining suitable traction between the vehicle and the road.

Under certain conditions, such as rain, snow, etc., the actual maximum lateral and longitudinal acceleration capabilities of the vehicle may be reduced. Accordingly, it is desirable to provide improved emergency braking and steering systems in which tire and road friction characteristics are taken into account. Other desirable features and characteristics of the present invention will become apparent from the subsequent detailed description and the appended claims, taken in conjunction with the accompanying drawings and the foregoing technical field and background.

BRIEF SUMMARY OF THE INVENTION

A vehicle control method in accordance with one embodiment generally included defining a set of predetermined criteria relating to the motion of a vehicle with respect to a surface, and defining a set of vehicle actions associated with the set of predetermined criteria. The vehicle actions each specify an audio/visual warning, a steering action and/or a braking action. Friction data indicative of a frictional attribute (e.g., dynamic coefficient of friction) of a contact region between the vehicle and the surface is received. The set of predetermined criteria are then modified based on the friction data.

A vehicle control system in accordance with one embodiment includes a collision preparation system controller configured to receive friction data indicative of the coefficient of friction between a vehicle and a road surface. A brake controller and a steering controller are coupled to the collision preparation system controller. The collision preparation system controller is configured to store a set of predetermined criteria relating to the motion of the vehicle, store a set of vehicle actions associated with the set of predetermined criteria, modify the set of predetermined criteria based on the friction input, and provide a braking command to the brake controller and/or steering command to the steering controller based on the modified set of predetermined criteria.

A collision avoidance method in accordance with one embodiment includes providing a set of predetermined criteria relating to the motion of the vehicle with respect to a road surface, wherein the set of predetermined criteria includes collision judgment criteria indicative of a possible collision of the vehicle with an object in the path of the vehicle. A set of vehicle actions corresponding to the set of predetermined criteria are provided, wherein the vehicle actions each specify at least an audio/visual warning, a steering action or a braking action. Friction data indicative of a frictional attribute of a contact region between the vehicle and the surface is received. The set of predetermined criteria are modified based on the friction data. When it is determined that the collision judgment criteria have been met, the system performs a selected audio/visual warning, steering action and/or a selected braking action corresponding to the collision judgment criteria.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 1 is a conceptual block diagram of a vehicle and system in accordance with one embodiment of the invention;

DETAILED DESCRIPTION

Figure 3:
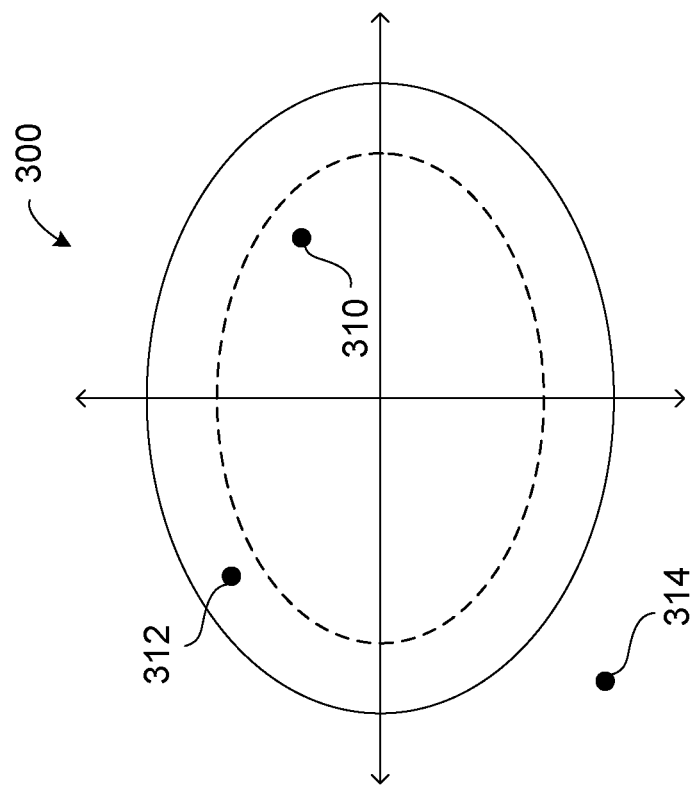
FIG. 3 is an exemplary friction circle useful in describing the present invention.

The following detailed description is merely illustrative in nature and is not intended to limit the embodiments of the subject matter or the application and uses of such embodiments. Furthermore, there is no intention to be bound by any express or implied theory presented in the preceding technical field, background, brief summary or the following detailed description.

The following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, many conventional techniques and principles related to vehicular braking systems, steering systems, control systems, and the like are not described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

FIG. 1 is a conceptual top-view block diagram of an exemplary collision avoidance system 100 for a motor vehicle (or simply "vehicle") 102. Note that, in the interest of clarity, various components of vehicle 102, such as tires, wheels, brakes, steering mechanisms, and the like, are not depicted in FIG. 1. Similarly, those skilled in the art will appreciate that, while vehicle 102 is shown in FIG. 1 as a standard automobile, the present invention may be employed in the context of trucks or any other vehicle in which emergency steering/braking may be desirable.

As shown, system 100 includes a set of brake actuators 104 coupled to a brake controller 120, and a steering actuator 106 coupled to a steering controller 110. Both brake controller 120 and steering controller 110 are coupled to a stability controller 122 and a collision preparation system (CPS) adjustment controller 124, which itself receives information (e.g., information regarding potential collision) from a CPS system 108.

In general, stability controller 122 receives various inputs 132 from sensors and other components of motor vehicle 102 relating to, for example, the speed, acceleration, wheel angle, and other attributes of motor vehicle 102. Stability controller 122 then processes these inputs and determines whether certain actions should be taken to maintain the stability (of vehicle 102. In one embodiment, for example, stability controller 122 is implemented as described in U.S. Pat. No. 5,941,919.

CPS system 108 is configured to determine the state of vehicle 102 with respect to objects in its environment—for example, objects in the path of vehicle 102 that might pose a risk of collision—and provide the appropriate signal and/or information to CPS adjustment controller 124. In one embodiment, CPS system 108 is implemented in the manner disclosed in one or more of U.S. Pat. No. 6,084,508, U.S. Pat. No. 7,375,620, and U.S. patent application Ser. No. 12/168,973, and thus includes one or more short range radar components, long range radar components, or any other collection of components configured to sense the presence of objects in the vicinity of vehicle 102.

CPS adjustment controller 124 receives a signal or other information from CPS system 108, processes that information, and determines whether steering and/or braking maneuvers should be performed to prevent or reduce the likelihood of collision with an object in the path of vehicle 102. That is, while stability controller 122 is generally concerned with maintaining the stability of vehicle 102, CPS adjustment controller is directed at preventing or mitigating the collision of vehicle 102 in the event certain criteria are met.

CPS adjustment controller 124, stability controller 122, brake controller 120, and steering controller together cooperate to adjust the braking and/or steering of motor vehicle 102 in response to information received from CPS system 108. That is, in general, in the event that the motion of vehicle 102 fits within certain predetermined criteria (modified, if necessary, by information related to road conditions), CPS adjustment controller 124 sends a braking signal to brake controller 120 system and/or a steering signal to steering controller 110, thereby causing brake actuator 104 and/or steering actuator 106 to effect the appropriate collision-avoidance maneuvers.

In accordance with the present invention, CPS adjustment controller 124 also receives an input 130 indicative of a frictional attribute (e.g., static or dynamic coefficient of friction) of the road surface with respect to the tires of vehicle 102 (in general, referred to as "friction data" 130), and uses that information to determine whether and to what extent collision-avoidance maneuvers should be performed. The term "friction data" is thus used without loss of generality to mean any form of signal, whether digital or analog, that represents road/tire friction directly, or can be used to derive and/or estimate road/tire friction. For example, friction data 130 may comprise an analog current or voltage that has been correlated (e.g., via a look-up table or empirically-derived equation) to a frictional attribute. Alternatively, friction data 130 may comprise a digital signal representing an integer or real number communicated in accordance with any convenient digital communication protocol.

Figure 5:
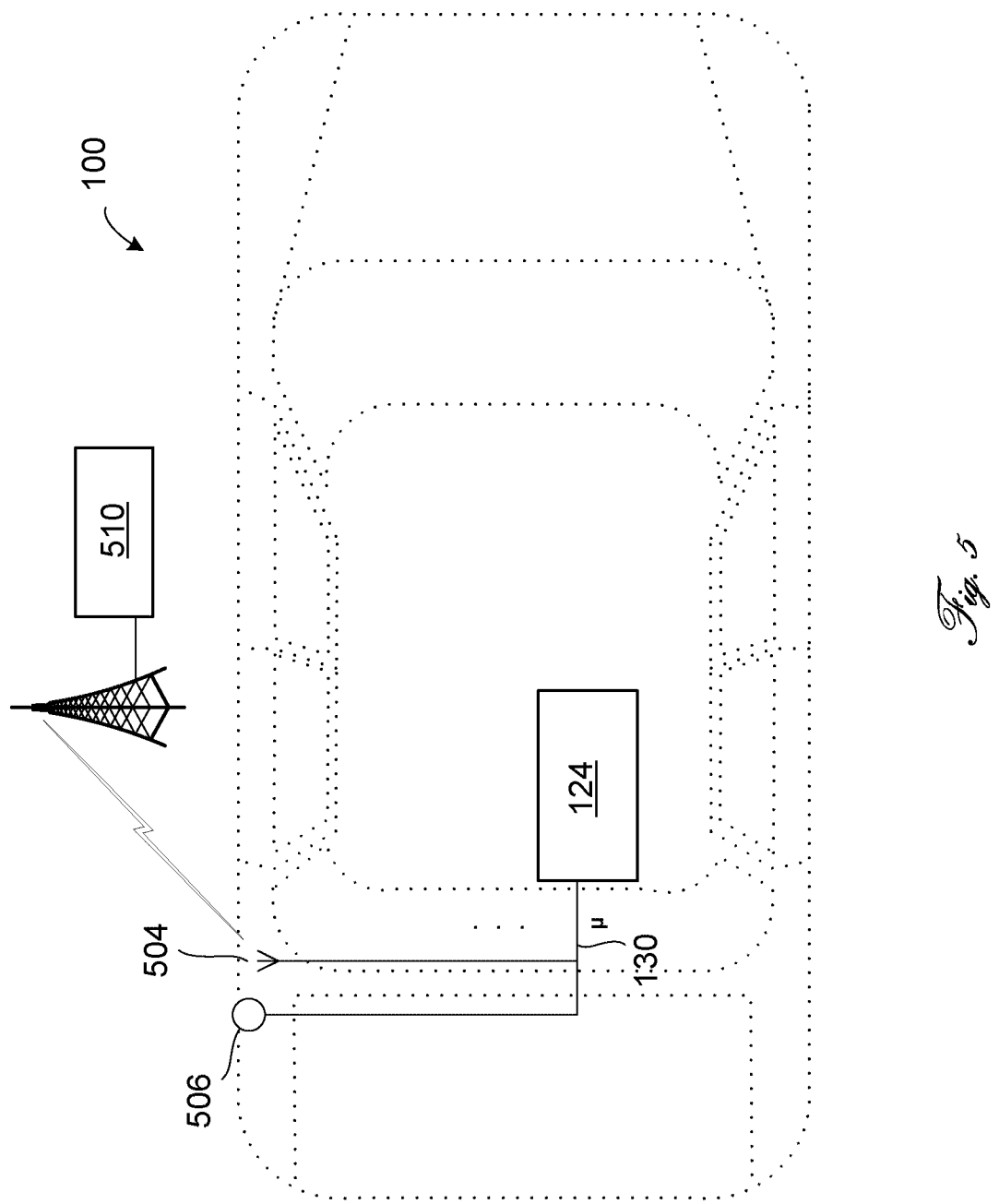
FIG. 5 is a conceptual block diagram showing various methods of acquiring friction data.

Friction data 130 may be acquired in a variety of ways. Referring to FIG. 5, for example, CPS adjustment controller 124 may be coupled to one or more sensors 506 capable of directly or indirectly determining friction data 130 and/or one or more transceivers 504 configured to wirelessly receive an external signal 502 containing the friction data 130 (or data from which that information may be derived).

In one embodiment, CPS adjustment controller is configured to receive friction data 130 directly from another vehicle (not shown) that has knowledge of the road conditions in the vicinity of vehicle 102. This might include, for example, a vehicle in front of vehicle 102 on the same roadway that is moving in the same direction. The friction data 130 may be received via any convenient data communication medium, such as via WiFi (IEEE 802.11), cellular networks (GSM, CDMA, etc.), ZigBee, WiMax, or any other wireless communication medium now known or later developed.

In another embodiment, CPS adjustment controller 124 is configured to receive weather information associated with the geographical location of vehicle 102 as determined by a global positioning system (GPS) or other locationing scheme. The weather information may then be used to derive (or modify) the frictional data 130. The weather information may be received periodically, in response to a request from CPS adjustment controller 124, or when certain weather conditions (e.g., heavy rain) are forecasted for the region through which vehicle 102 is traveling. For example, vehicle 102 may receive (via transceiver 504) a weather report from a weather reporting service indicating that the region in which vehicle 102 is traveling has recently received heavy rain. This information may then be used by CPS adjustment controller 124 to modify friction data 130 (i.e., by assuming that the actual coefficient is less than its current estimate). The weather information may be in any convenient open or proprietary format, including cleartext, XML, or the like.

In another embodiment, CPS adjustment controller 124 is configured to receive a direct value of friction data 130 from a computer system or external server 510 as determined from other vehicles that have been in the same area within a certain timeframe. That is, friction data 130 may be "crowdsourced" by vehicles that are capable of measuring and uploading to server 510 any friction data 130 that it has measured or otherwise acquired.

In another embodiment, CPS adjustment controller 124 determines (via stability controller 122 of FIG. 1) that an ABS or stability control event has occurred when performing a maneuver that would normally not cause such an event. CPS adjustment controller 124 then reduces its estimate of friction data 130 accordingly.

In another embodiment, CPS adjustment controller may instruct brake controller 120 of FIG. 1 to perform a short brake pulse and then examine monitor the vehicle's longitudinal acceleration and when/if the vehicle enters ABS friction data 130. In another embodiment, sensor 506 is an accelerometer incorporated into the tread of a tire (e.g., a "smart tire") coupled to vehicle 102, and is thereby configured to directly measure the friction data 130 associated with the tire's contact with the road surface. In another embodiment, sensor 506 comprises a sensor that examines the road surface as vehicle 102 travels over it. The resulting optical, infrared, UV, IR, or other data is then used to estimate the frictional characteristics of the surface.

In another embodiment, external weather conditions are sensed directly in the conventional manner, and the sensed readings (e.g., temperature, humidity, windshield wiper usage, rain sensors, etc.) are used in part to derive friction data 130. In this regard, one or more of the methods described above may be employed, and server 510 and/or CPS adjustment controller 124 may select a best estimate for friction data 130 given competing and inconsistent data. For example, a weighting scheme based on geographic proximity, temporal proximity, accuracy of measurement method, and other such factors may be employed.

Regardless of the way friction data 130 is acquired or derived, this data preferably includes at least one coefficient of friction value. More particularly, referring to FIG. 2, a tire 204 (e.g., with respect to FIG. 1, a tire on vehicle 102 that is mechanically coupled, indirectly, to a brake actuator 104 and steering actuator 106) makes contact with a surface 202 (e.g., a road surface). Due in part to the weight of vehicle 102, a force F is imparted to tire 204, producing an opposite and equal normal force N on tire 204 within a contact region (or "contact patch") 206 of surface 202. The illustrated frictional force $F_f$ is then the force resisting the relative longitudinal motion of tire 204 at contact region 206 with respect to surface 202 (i.e., sliding motion). While the vector force $F_f$ is shown as pointing left-to-right, those skilled in the art will appreciate that, depending upon kinematic conditions, $F_f$ may be oriented in any arbitrary direction orthogonal to normal force N.

This force $F_f$ is expressed as the product of the normal force N and a dimensionless parameter μ, referred to as the coefficient of friction. This coefficient of friction μ may be a measure of either the static coefficient of friction or the dynamic coefficient of friction. The static coefficient of friction is associated with the friction between two objects that are not moving with respect to each other at their point of contact (i.e., region 206). Conversely, the dynamic coefficient of friction is associated with the friction between two objects undergoing relative motion at their point of contact.

In the context of the present invention, the term coefficient of friction generally refers to the effective static coefficient of friction between tire 204 and surface 202, and may thus take into account any of the various subcategories of frictional effects, including fluid friction, dry friction, skin friction, and the like. That is, the coefficient of friction may take into account the presence of water, oil, debris, and/or other material that might be present between tire 204 and surface 202.

Figure 2:
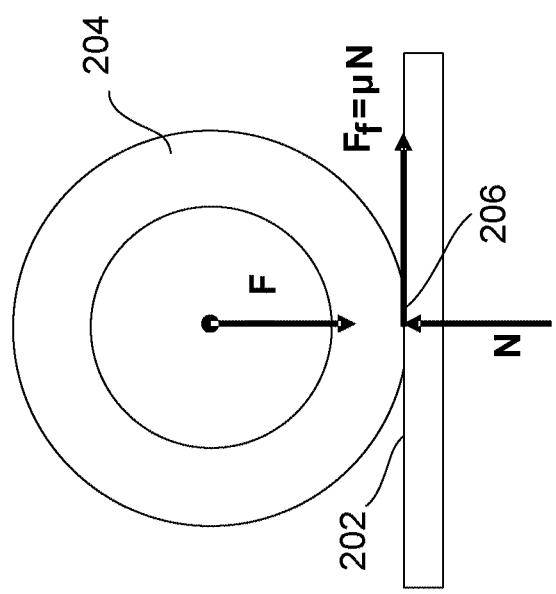
FIG. 2 is a conceptual diagram illustrating the nature of road/tire friction.

With continued reference to FIG. 2, if it is assumed that tire 204 is rotating clockwise, and thus moving from left to right, then tire 204 will continue to rotate in a well-behaved fashion, maintaining fraction, as long as the longitudinal force applied by tire 204 in region 206 does not exceed the magnitude of frictional force $F_f$. If, however, the longitudinal force (e.g., due to excessive forward acceleration or sudden braking) exceeds the magnitude of $F_f$, then tire 204 will lose traction and slip with respect to surface 202, i.e., rather than simply rolling in the clockwise direction.

In order to maintain a vehicle within its frictional force limits as described in conjunction with FIG. 2, it is often convenient to visualize the "friction ellipse" or "friction circle" governing the motion of the vehicle. More particularly, referring to FIG. 3, a friction circle diagram 300 is a concept that graphically represents the traction capacity of a vehicle under various combinations of acceleration and cornering. The horizontal axis corresponds to the direction the car is turning (left, right), and the vertical axis corresponds to the acceleration conditions (forward acceleration, braking). Stated another way, each point within diagram 300 represents a vector resulting from the vector addition of a longitudinal acceleration vector and a perpendicular lateral acceleration vector.

Thus, the origin in diagram 300 generally corresponds to a vehicle going straight at a constant velocity, the upper right quadrant corresponds to a vehicle that is accelerating and turning right, the lower left quadrant corresponds to a vehicle that is decelerating (braking) while turning left, and so on.

The closed curve (i.e., "friction circle") 302 is the boundary between conditions in which the vehicle can maintain traction (the area inside circle 302) and conditions in which the vehicle will not maintain traction (the area outside circle 302). For example, points 310 and 312 (and the vectors they represent) lie within the friction circle 302, while point 314 lies outside the friction circle 302.

The points where friction circle 302 intersects the x-axis correspond to the maximum lateral acceleration capability of the vehicle. Similarly, the points where friction circle 302 intersects the y-axis correspond to the maximum longitudinal acceleration capability of the vehicle.

In any practical application, the shape of friction circle 302 depends on a myriad of factors, including tire characteristics (tire material, tread, temperature, etc.), road surface conditions, vehicle weight, vehicle dynamic characteristics, and the like. As a result, the shape of friction circle 302 is generally determined empirically, through experimentation and/or modeling. In this regard, those skilled in the art will recognize that the term "friction circle" is a term of art, and that the shape of closed curve 302 is almost never perfectly circular, tending rather to be an ellipsoid having its major axis along the horizontal axis of diagram 300 (as illustrated). Because of this, it is typical for a vehicle to have greater traction in braking than it does in turning. Nevertheless because a steering collision avoidance maneuver can often be accomplished more quickly than a braking collision avoidance maneuver, it is desirable in some collision-avoidance situations to incorporate steering maneuvers to augment the traditional braking maneuvers.

In general, a collision avoidance process performed by CPS adjustment controller 124 of FIG. 1 includes storing (e.g., within a table 125) a set of criteria 151 and a set of corresponding actions 152 (e.g., evasive braking and steering maneuvers), modifying the criteria based on the friction data, then performing the appropriate actions when the corresponding criteria are met.

Figure 4:
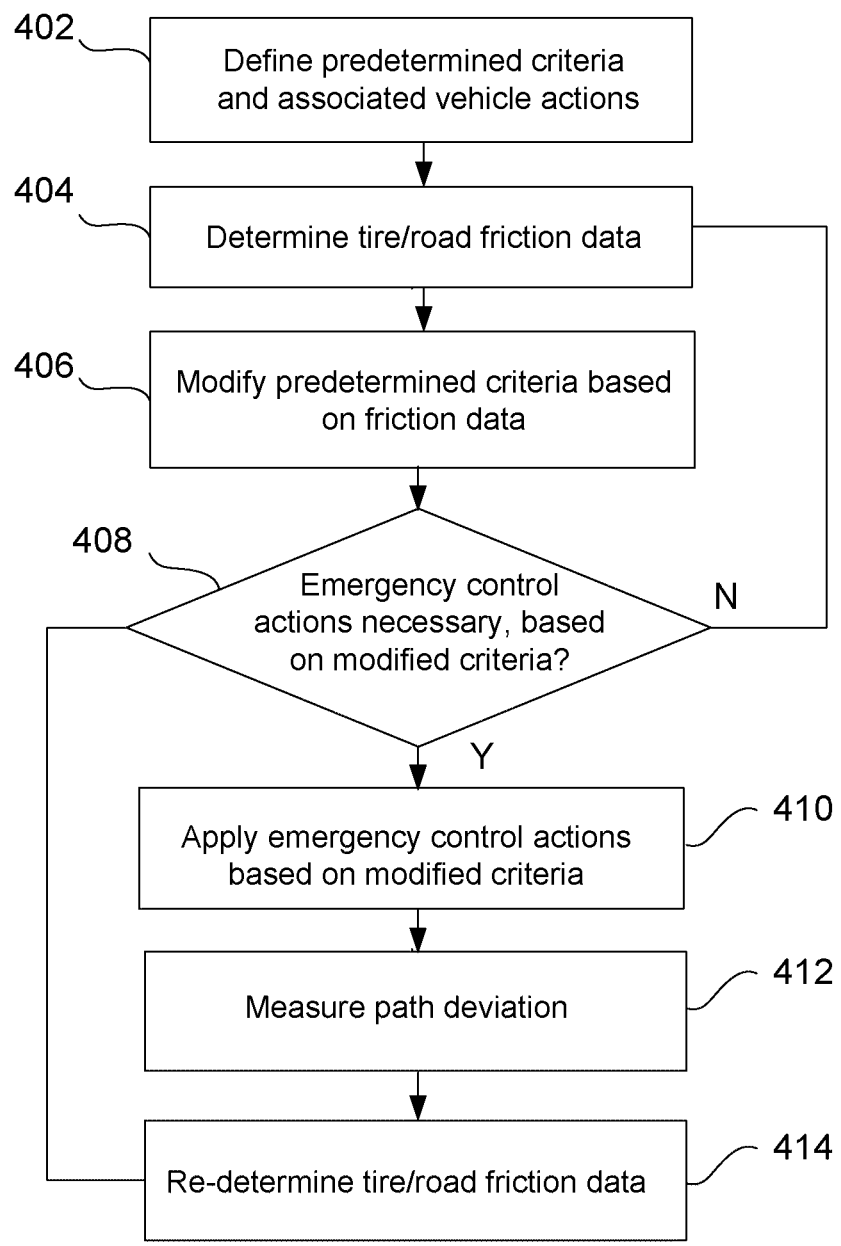
FIG. 4 is a block diagram depicting a method in accordance with one embodiment of the present invention.

Referring now to FIG. 1 in conjunction with FIG. 4, an exemplary vehicle control method begins with defining a set of predetermined criteria and associated vehicle actions (step 402). The predetermined criteria may be stored in CPS adjustment controller 124 at the time of manufacture, or downloaded electronically at a later date.

The predefined criteria 151 may include, for example, what are referred to as "driver action lines"—i.e., conceptual vertical lines (161, 162, etc.) distributed along a time axis as shown, each corresponding to a particular "time to collision" (TTC), and each associated with an action 152 that should be taken (or an action that a reasonable driver should already have taken at that point in time). These lines 161, 162 may be calculated by examining driver behavior or by using the handling limits of the vehicle. In the latter case, the lines are often referred to as Collision Judgment Lines.

For example, one driver action line 161 might correspond to a TTC of 4.8 seconds (i.e., a collision will occur in 4.8 seconds if the current braking and steering remain unchanged). In such a case, the corresponding vehicle action 152 might include normal braking (0.25 g deceleration). As the TTC gets smaller, the corresponding action will typically become more severe. Thus, another driver action line 162 at a TTC of 3.0 seconds might specify hard braking (0.4 g deceleration), followed by full braking (0.9 g) at a TTC of 1.0 seconds, and optimized braking/steering at a TTC of 0.62 seconds.

The collision judgment lines for any particular vehicle may be derived from a friction circle diagram as shown in FIG. 3, or from other information that characterizes the lateral and longitudinal acceleration limits. That is, known methods (skid pad testing, simulations, etc.) may be performed for a particular vehicle to determine a nominal friction circle, or a subset of information regarding that circle (e.g., maximum and minimum points along each axis). This information can then be used, as described in further detail below, to determine how much braking and/or steering the vehicle can maintain without exceeding its friction circle limits.

Next, in step 404, the system determines the tire/road friction data 130. This may be accomplished in a variety of ways, including one or more of the methods described above. Irrespective of the method used to acquire the friction data, the system then modifies the predetermined criteria accordingly.

More particularly, under certain road conditions (e.g., after a light rain), the coefficient of friction between the road surface and the tires of vehicle 102 can be significantly reduced, thereby effectively shrinking the friction circle. This is shown in FIG. 3 as the dotted line 303, which represents, conceptually, the reduction in area that attends a reduction in coefficient of friction. In accordance with the present invention, the predetermined criteria and corresponding actions are modified based on the friction data 130, thereby maintaining the vehicle 102 within the actual friction circle 303 rather than the nominal (i.e., best case) friction circle 302.

Figure 6:
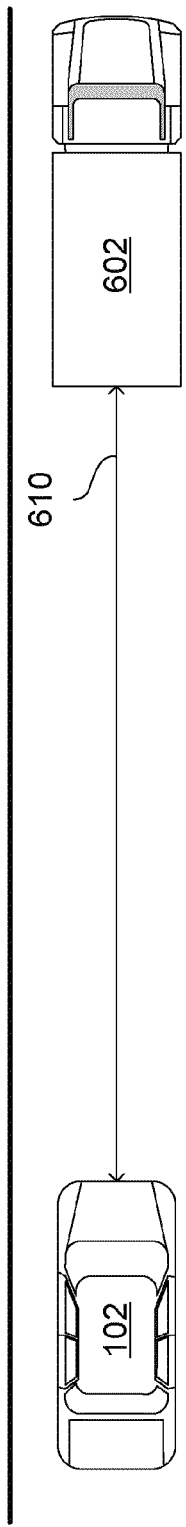
FIGS. 6-8 are top-view diagrams illustrating collision avoidance in accordance with one example.

It is known that, between any two vehicles (as shown in FIG. 6), the time-to-brake (to avoid collision), TTB, is given as:

$$TTB = -V/A_s$$

where V is the range rate between the a host (i.e., vehicle 102 in FIG. 1) and a target vehicle (the vehicle in the path of the host vehicle), and $A_s$ is the maximum deceleration of the host vehicle subtracted from the target vehicle's deceleration, i.e.:

$$A_s = A_{dec} - A_t$$

Thus, the range (distance between vehicles) at TTB is given by:

$$R = 0.5 V * TTB = -0.5 * V^2/A_s$$

A simplified time-to-collision (TTC) can then be computed as the range divided by the range rate, or:

$$TTC = -0.5 * V/A_s$$

The steering collision judgment line (CJLS) criterion can be derived from the above as:

$$CJLS_t = CJLS_d / (V_h - V_t) \quad \text{(time domain)}$$
$$CJLS_d = R_f * \sin(e) - L - V_t * R_f * I' / V_h \quad \text{(distance domain)}$$

where:

$V_h$ = velocity of the host vehicle (vehicle 102)

$V_t$ = velocity of the target object $R_f = ((V_h^4 / A_{ymax}^2 - b^2)0.5 + T/2)^2 + L^2)0.5 + (W - T)$ $e = \cos^{-1}((R_f - L^2) - a_0 / R_f)$ $L$ = wheelbase of the host vehicle $I'$ = angle through which the host vehicle will turn
$= \cos^{-1}((R_f - L^2) - a_0 / R_f) - \sin^{-1}(L / R_f)$ $b$ = distance of the center of gravity to rear wheel axle for host vehicle $W$ = width of host vehicle $T$ = track of host vehicle Given these relations, then, the system modifies the criteria (in this case, the collision judgment line CJLS values) by adjusting the longitudinal and lateral acceleration capabilities ($A_{dec}$ and $A_{ymax}$). For example, while $A_{dec}$ is usually assumed to be about 1.0 g under nominal road conditions, the system might reduce this value, based on the friction data 130, to 0.6 g. Similarly, the value of $A_{ymax}$, which is often assumed to be about 0.8 g, can be reduced accordingly. In one embodiment, a linear function is used to reduce these values (e.g., to about 0.4 g).

The above relations may also be used to modify other such criteria, such as the braking collision judgment line (CJLB) or any other criteria used in collision avoidance and vehicle control.

Returning to FIG. 4, in block 408 the system determines whether control actions are necessary based on the predetermined criteria, which might have been modified by the friction data 130. That is, the system determines whether, for example, the vehicle has reached the CJLB or CJLS judgment lines without the driver reacting in an appropriate manner to avoid collision.

If not, the method returns to step 404 and continues as before. If so, however, the system applies emergency control actions (step 410). That is, with momentary reference to FIG. 1, the CPS adjustment controller 124 sends the appropriate commands to brake controller 120 and steering controller 110 to achieve the desired vehicle path.

Next, in step 412, the system may measure the path deviation—that is, the difference between the actual path of the vehicle and the intended path of the vehicle after applying the emergency control actions. Next, the friction data is also re-determined (step 414). Based on the re-determined friction data, and the measured path deviation, the system has additional information for its determination in step 408 regarding whether and to what extent emergency actions are necessary. That is, the system may determine that more extreme actions should be taken, such as more forceful braking and/or more dramatic autonomous steering.

The system continues to loop (steps 408, 410, 412, and 414) until no further emergency control actions are needed. Operation then resumes to normal (steps 404, 406, and 408).

Figure 7:
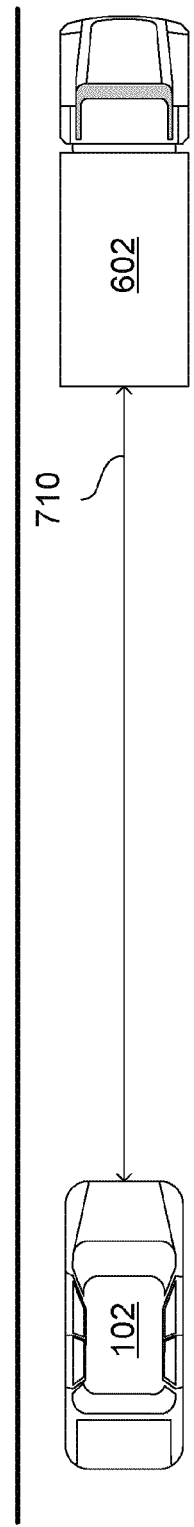
Figure 8:
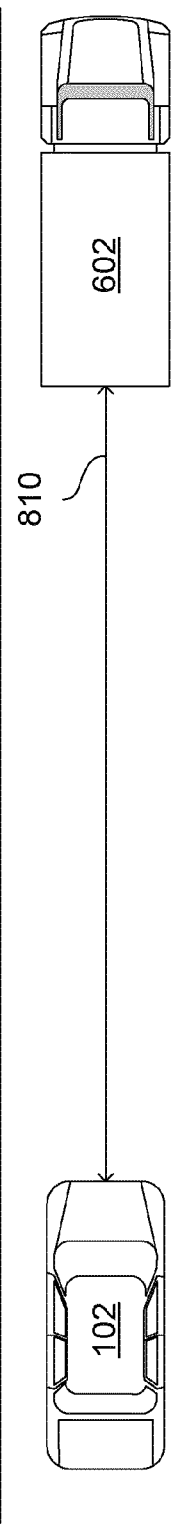

An example of the above method is illustrated in the top-down view of FIGS. 6-8. The top image, FIG. 6, depicts a vehicle 102 (the "host vehicle") moving left to right toward a second vehicle 602 (the "target vehicle"). For the purpose of this example, it is assumed that the distance between the two vehicles (610) is 40 m, and the range rate V (the difference between the speeds of vehicles 102 and 602) is 13.0 m/s. That is, vehicle 102 is closing in on vehicle 602 at a relative speed of 13.0 m/s, with a time-to-collision (TTC) of 3 s. In accordance with the methods described above, it is also assumed that the system has determined that the road conditions are such that the maximum longitudinal acceleration capability has been reduced to 0.6 g (from about 1.0 g). Under such conditions, in this example, none of the predetermined criteria are met, and therefore no emergency vehicle actions are taken.

In FIG. 7, however, when the range between the vehicles has reduced to 20 m, with a TTC of 1.5 s. Under these conditions, one of the predetermined criteria is met, and the system requests braking of 0.3 g. Under normal conditions, without factoring in the reduced coefficient of friction, the system would not have found the criterion to be met, and would not have requested this braking.

In FIG. 8, with a range of 9.9 m, and a TTC of 0.9 sec, one or more additional criteria are met, and the system requests 0.6 g braking. The net effect of the emergency control actions is that the targeted velocity reduction (in this case, 10.3 m/s) is equal to the actual velocity reduction. Without compensating for the reduction in coefficient of friction, it is likely that the actual velocity reduction would have been less than the targeted velocity reduction. That is, the appropriate steering and/or braking actions would have taken place later in the process.

The example in FIG. 8 might also have included steering commands. That is, in addition to the requests for braking, the system might have requested a combination of steering and braking commands in order to keep vehicle 102 within the friction circle as modified based on the friction data (130 in FIG. 1).

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A vehicle control method comprising:
    defining a set of predetermined driver action lines relating to the motion of a vehicle with respect to a surface, wherein the set of predetermined driver action lines are based in part on a maximum lateral acceleration capability of the vehicle and a maximum longitudinal acceleration capability of the vehicle;
    defining a set of vehicle actions associated with the set of predetermined driver action lines, wherein the vehicle actions each specify at least one of a steering action and a braking action;
    determining friction data indicative of a frictional attribute of a contact region between the vehicle and the surface;
    modifying the set of predetermined driver action lines based on the friction data;
    controlling the vehicle in accordance the set of vehicle actions and the first predetermined driver action line;
    re-determining the friction data based on the dynamic behavior of the vehicle while controlling the vehicle; and
    modifying the set of predetermined driver action lines based on the re-determined friction data.

2. The method of claim 1, wherein defining the set of predetermined driver action lines includes determining a first friction circle associated with the vehicle.

3. The method of claim 2, wherein modifying the set of predetermined driver action lines includes defining a second friction circle associated with the vehicle, wherein the second friction circle lies at least partially within the first friction circle.

4. The method of claim 1, wherein the friction data is received from a second vehicle.

5. The method of claim 1, wherein the friction data is received from one or more sensors coupled to the vehicle.

6. The method of claim 1, wherein the friction data is derived in part from weather information associated with the geographical location of the vehicle.

7. The method of claim 1, wherein the set of predetermined driver action lines are modified by reducing the maximum longitudinal acceleration capability and the maximum lateral acceleration capability of the vehicle based on the friction data.

8. The collision avoidance method of claim 1, wherein the friction data is based on an unexpected occurrence of a stability control event.

9. The collision avoidance method of claim 1, wherein the friction data is based on the occurrence of an anti-lock brake system event in response to a brake pulse applied independent of a user of the vehicle.

\* \* \* \* \*